US005710235A

United States Patent [19]

Abbey et al.

[11] Patent Number: 5,710,235
[45] Date of Patent: Jan. 20, 1998

[54] OLEFINIC AND URETHANE-TERMINATED ESTER POLYALKADIENE

[75] Inventors: Kirk Joseph Abbey, Raleigh; Ian Christopher Quarmby, Apex, both of N.C.

[73] Assignee: Lord Corporation, Cary, N.C.

[21] Appl. No.: 570,055

[22] Filed: Dec. 11, 1995

[51] Int. Cl.$^6$ ................................................... C08G 63/52
[52] U.S. Cl. ..................... 528/288; 525/331.9; 525/333.2
[58] Field of Search ............................. 525/331.9, 333.2; 528/288

[56] References Cited

U.S. PATENT DOCUMENTS

| | | | |
|---|---|---|---|
| 3,897,514 | 7/1975 | Allabashi | 260/836 |
| 3,910,992 | 10/1975 | Skillicorn | 260/485 G |
| 3,925,330 | 12/1975 | McCarthy | 260/78.5 B |
| 4,156,700 | 5/1979 | Tremblay et al. | 260/837 R |
| 4,322,509 | 3/1982 | Zalucha | 525/287 |
| 4,467,071 | 8/1984 | Dawdy | 525/112 |
| 4,532,299 | 7/1985 | Seneker | 525/122 |
| 4,769,419 | 9/1988 | Dawdy | 525/111 |
| 4,857,434 | 8/1989 | Klinger | 430/286 |
| 5,492,976 | 2/1996 | Shalati et al. | 525/285 |
| 5,587,433 | 12/1996 | Boeckeler | 525/333.2 |

FOREIGN PATENT DOCUMENTS

| | | |
|---|---|---|
| 92-055453 | 9/1992 | Japan . |
| 94-017451 | 3/1994 | Japan . |

OTHER PUBLICATIONS

CAPLUS accession no. 1978:153993, Nippon Gomu Kyokaishi, vol. 51, No. 3, pp. 187–193, 1978.

CAPLUS accession no. 1978:425328 for Japanese Patent No. 53–22589, Matsushita Electric Workds, Ltd., Mar., 1978.

CAPLUS accession no. 1994:79561 for Japanese Patent No. 4–154823, Dainippon Ink and Chemicals, Inc. May, 1992.

*Primary Examiner*—Robert E. Sellers
*Attorney, Agent, or Firm*—Wayne W. Rupert

[57] ABSTRACT

An olefinic-terminated polyalkadiene that includes carboxy ester linking groups and at least one nascent secondary hydroxyl group that is capped with a monoisocyanate. This polyalkadiene can be made by reacting a hydroxyl-terminated polyalkadiene with a saturated cyclic acid anhydride to form a carboxylic acid-terminated polyalkadiene, reacting the carboxylic acid-terminated polyalkadiene with an olefinic monoepoxide to form an olefinic-terminated polyalkadiene, then reacting the olefinic-terminated polyalkadiene with a monoisocyanate.

11 Claims, No Drawings

OLEFINIC AND URETHANE-TERMINATED ESTER POLYALKADIENE

BACKGROUND OF THE INVENTION

This application is related to commonly-assigned, concurrently filed, U.S. patent application Ser. No. 08/570,422, allowed.

This invention relates to a polyalkadiene polymer that is modified to include useful segments in its backbone structure and useful terminal groups. This invention also relates to a process for producing such modified polyalkadiene polymers.

Polybutadiene elastomers have been modified to include various terminal or pendant groups for various purposes. One class of modified polybutadienes is liquid vinyl- or olefinic-terminated polybutadienes. For example, U.S. Pat. No. 3,910,992 and U.S. Pat. No. 3,925,330 describe reacting a carboxyl-terminated polybutadiene with glycidyl acrylate to obtain a liquid vinylidene-terminated polymer of the structure:

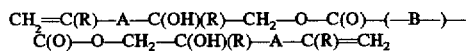
$$\text{C(O)—O—CH}_2\text{—C(OH)(R)—A—C(R)=CH}_2$$

wherein A is preferably a bivalent radical of the structure —CH$_2$—O—C(O)— and B is a polybutadiene backbone. A tertiary amine is the preferred catalyst.

U.S. Pat. No. 3,897,514 discloses a process for curing hydroxy-terminated prepolymer to rubber that includes mixing a hydroxy-terminated polybutadiene prepolymer with a curing system comprising a cyclic anhydride and a di- or tri-functional epoxide. The curing catalyst is a chromium salt. The epoxides are diglycidyl ether epoxides, cyclic aliphatic diepoxides and triepoxides. The resulting product is cured and is a solid.

U.S. Pat. No. 4,156,700 discloses a propellant additive that is a prepolymer derived from reacting hydroxyl-terminated polybutadiene and an anhydride. According to Example 1, a mixture of 1420 g (1.00 eq) hydroxyl-terminated polybutadiene (R45M from Arco Chemical), 100 g (1.0 mole) succinic anhydride and benzene are heated under reflux conditions for 48 hours. After evaporation of the solvent the viscosity of the resulting product is reported to be 180 poises at 25° C. According to Example III, a mixture of 154 g (1 eq.) cis-1,2-cyclohexanedicarboxylic anhydride and 1420 g (1 eq.) R45M polybutadiene is heated at 90° C. for 66 hours. The resulting product is reported to have a viscosity of 374 poises at 25° C.

U.S. Pat. No. 4,769,419 discloses a urethane modified olefinic-terminated liquid elastomer useful as an additive for acrylic structural adhesives. The precursor for producing the novel elastomer is derived by reacting olefinic monoepoxide compounds (e.g., glycidyl methacrylate) with polycarboxylic homopolymers or copolymers of conjugated dienes having from 4 to 12 carbon atoms (e.g., carboxylated polybutadiene). According to Examples 1-3, 1,8-diazabicyclo[5.4.0]undec-7-ene is used as a catalyst for reacting carboxyl-terminated polybutadiene liquid rubber and glycidyl methacrylate. The precursor compound is reacted with a monoisocyanate (phenyl isocyanate) to produce the novel elastomer. An acrylic structural adhesive composition is described that includes the novel elastomer.

U.S. Pat. No. 4,857,434 discloses a liquid methacrylate terminated polymeric hydrocarbon maleate prepolymer having pendant maleate groups. This prepolymer is obtained by a multi-step synthesis that includes two separate maleation reactions (i.e., there are two steps of reacting an intermediate with maleic anhydride).

The first step involves the reaction of a functionalized liquid hydrocarbon polymer having hydroxyl, thiol or amine terminal groups "with an unsaturated carboxylic acid anhydride" to provide a maleate. The structure given in column 4 for the unsaturated carboxylic acid anhydride reactant includes a C=C bond in the heterocyclic ring. The reaction of 2 moles of maleic anhydride with each mole of hydroxyl terminated polybutadiene is presented as an example. The reaction product structure shown in column 3 includes a C=C bond outside the polybutadiene core backbone. The reaction "is preferably carried out in the presence of a thermal inhibitor such as di-t-butyl cresol" and, "although no catalysts are necessary", phosphoric acid and stannous octoate are mentioned. "The reactants are usually added in approximately stoichiometric amounts so that each functional group, e.g., a hydroxyl on the polymer, can react with one maleic anhydride molecule".

The second step involves reacting the maleate with a reagent containing a methacrylate group. Glycidyl methacrylate is mentioned as a methacrylate-containing reagent. A catalyst is not necessary, but triethylamine is mentioned as one catalyst useful for reducing reaction time and temperature.

The third step involves reacting maleic anhydride with the hydroxyl groups generated by the previous reaction with glycidyl methacrylate to provide pendant maleate groups.

The prepolymer by itself or with mono- or multi-functional unsaturated monomers (such as a reactive acrylic or methacrylic diluent) and with either a thermal or photo-initiator on exposure to heat, UV or high energy ionizing radiation forms a cured material that is said to be useful as an adhesive.

JP-B-94017451, according to an English translation, discloses a flexible resin composition that is made by mixing an epoxy resin and the product of an "alkenyl anhydrous succinic acid" reacted with a hydroxy-terminated polybutadiene. The epoxy resin component typically is a diepoxide such as bisphenol A diglycidyl ether, although the possibility of a liquid mono-epoxy resin also is mentioned. The resin composition is said to be useful for insulation.

JP-B-92055453, according to an English translation, discloses a rubber composition that includes a solid rubber and the product of a liquid diene copolymer having a terminal hydroxyl group reacted with an "alkenyl anhydrous succinic acid". The diene/alkenyl anhydrous succinic acid reaction can be carried out at 10°–200° C., 1–10 atms and 0.5–24 hours. The "alkenyl anhydrous succinic acid" is provided in an amount greater than necessary to react all of the hydroxy groups.

Although prior liquid modified polyalkadiene elastomers have proven to be very useful, it would be advantageous if there was a liquid modified polyalkadiene that could be produced less expensively and exhibit less odor. For example, the liquid elastomer of U.S. Pat. No. 4,769,419 has a sufficiently high viscosity that a diluent is required during its commercial production. The presence of diluent increases the complexity and cost of processing and application and contributes to the odor of the adhesive. A less expensive liquid elastomer that has a lower viscosity so that a diluent is not required during commercial processing would be very desirable.

SUMMARY OF THE INVENTION

According to the invention there is provided a polymer A having the structure

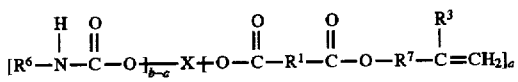

wherein

X is a polyalkadiene residue, a averages from 1.2 to 2.6, preferably 1.6 to 2.4, per polymer molecule, provided a is≦b, b is at least 1.2, preferably 1.2 to 3, more preferably 1.6–2.4, per polymer molecule, $R^1$ is a divalent radical that includes at least two carbon atoms and is selected from the group consisting of saturated alkylene, substituted saturated alkylene, arylene, and saturated heterocyclic, $R^6$ is phenyl, napthyl, an alkyl group having from 1 to 24 carbon atoms, substituted phenyl, substituted napthyl, phenylalkyl or napthylalkyl, and $R^7$ has the structure

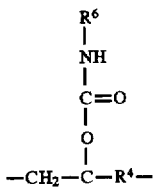

wherein $R^4$ is a divalent radical selected from the group consisting of alkylene, alkylene ester, arylene and alkylene ether, and $R^3$ is hydrogen, an alkyl group of 1 to 4 carbon atoms, $-CH=CH_2$, or $-R^5-CH=CH_2$ wherein $R^5$ is an alkylene radical having 1 to 4 carbon atoms.

Polymer A as a liquid elastomer can be used as a toughening agent in adhesives, particularly structural adhesives. It has the advantage of lower viscosity and less odor relative to the liquid elastomer disclosed in U.S. Pat. No. 4,769,419.

There also is provided according to the invention a method for producing polymer A. The method includes reacting a hydroxyl-terminated polyalkadiene with a saturated cyclic acid anhydride to form a carboxylic acid-terminated polyalkadiene intermediate that includes a carboxyl-containing linkage between a polyalkadiene backbone and the carboxylic acid terminal group, reacting the carboxylic acid-terminated polyalkadiene intermediate with an olefinic monoepoxide to form an olefinic-terminated polyalkadiene that includes at least 2a carboxy ester (—C(O)—O—) linking groups, wherein a is the same as in the formula for polymer A, and then reacting the olefinic-terminated polyalkadiene with a monoisocyanate to form polymer A.

There also is provided according to the invention a polymer B that is useful as an intermediate in the production of polymer A. Polymer B also can be used as a toughening agent in adhesives or composite matrix materials wherein the terminal vinylidene groups can be reacted with a component in the adhesives or matrix materials. Polymer B has the structure

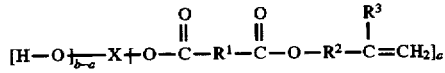

wherein

X is a polyalkadiene residue, a averages 1.2 to 2.6, preferably 1.6 to 2.4, per polymer molecule, provided a is≦b, b is at least 1.2, preferably 1.2 to 3, more preferably 1.6–2.4, per polymer molecule, $R^1$ is a divalent radical that includes at least two carbon atoms and is selected from the group consisting of saturated alkylene, substituted saturated alkylene, arylene, and saturated heterocyclic, $R^2$ has the structure

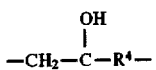

wherein $R^4$ is a divalent radical selected from the group consisting of alkylene, alkylene ester, arylene and alkylene ether, and $R^3$ is hydrogen, an alkyl group of 1 to 4 carbon atoms, $-CH=CH_2$, or $-R^5-CH=CH_2$ wherein $R^5$ is an alkylene radical having 1 to 4 carbon atoms.

DETAILED DESCRIPTION OF THE PREFERRED EMBODIMENTS

The two novel materials of the invention represented by the formulae A and B shown above can be produced by a novel process. In general, a hydroxyl-terminated polyalkadiene is reacted with a saturated cyclic acid anhydride to produce a carboxylic acid-terminated polyalkadiene intermediate that includes a carboxy ester linkage between a polyalkadiene core and the carboxylic acid terminal group. The carboxylic acid-terminated polyalkadiene intermediate is reacted with at least one olefinic monoepoxide, particularly a methacrylate or acrylate compound (such class of compounds being referred to herein as a (meth)acrylate compound) that contains an epoxy terminal group to produce a (meth)acrylate-terminated polyalkadiene that includes at least 1.2 nascent secondary hydroxyl groups that may be represented in formula B. The methacrylate-terminated polyalkadiene then is reacted with one or more monoisocyanates to cap the nascent secondary hydroxyl groups and the residual hydroxyl groups remaining on the polyalkadiene core to produce an elastomeric polymer that may be represented in formula A. This process is described below in more detail.

A polyalkadiene residue X is the core segment of the polymer backbone of the modified polyalkadiene of the invention. The polyalkadiene residue X is the structure that results when a polyalkadiene is reacted according to the method of the invention. As employed herein the term "polyalkadiene" refers to polymers derived from at least one conjugated diene such as 1,3-butadiene, 2-methyl-1,3-butadiene, 2-chloro-1,3-butadiene, and the like, and includes not only homopolymers of such dienes but also copolymers or terpolymers of such dienes and one or more other monomers copolymerized therewith, such other monomers preferably being selected from the group consisting of acrylonitrile, methacrylonitrile, styrene and olefinic monocarboxylic acids and their esters. Such polyalkadienes are well-known and are described, for example, in U.S. Pat. No. 4,769,419. The preferred polyalkadiene precursors are polybutadiene, poly(butadiene-acrylonitrile) and poly(butadiene-methacrylonitrile-acrylic acid), with polybutadiene, particularly 1,4-polybutadiene, being especially preferred. The relative amount of the different repeating units derived from the dienes and the other monomers, if present, may vary. In general, the polyalkadiene residue X can include 5–98 weight percent 1,4-polybutadiene, 0 to 95 weight percent 1,2-polybutadiene, 0 to 40 weight percent acrylonitrile, 0 to 40 weight percent styrene, and 0 to 5 weight percent acrylic or methacrylic acid or ester, based on the weight of the polyalkadiene residue X. Another possible precursor is a partially- or fully-hydrogenated polyalkadiene, preferably partially- or fully-hydrogenated polybutadiene. "Partially-hydrogenated polyalkadiene" as used herein means that from between 1 and 99 percent of the olefinic unsaturated bonds in the polyalkadiene are reduced to the saturated alkane structure. "Fully-hydrogenated polyalkadiene" as used herein means that substantially 100 percent of the olefinic unsaturated bonds in the polyalkadiene are reduced to the saturated alkane structure. When higher levels of hydrogenation are used, a greater degree of 1,2-vinyl polymerization of the diene monomer is required to prevent crystallinity. The polyalkadiene precursor preferably is a liquid at 20° C.

$R^1$ is a divalent saturated alkylene, divalent substituted saturated alkylene, divalent aromatic radical or divalent saturated heterocyclic radical that is derived, along with the carboxy ester radical attached to the polyalkadiene residue X, from the reaction of the hydroxyl terminal groups of the polyalkadiene precursor and a saturated cyclic acid anhydride. As used herein "saturated cyclic acid anhydride" means an acid anhydride that does not include any non-aromatic unsaturation in the ring structure that includes the acid anhydride functionality. The particular structure of $R^1$ will depend upon the specific saturated cyclic acid anhydride. $R^1$ may be a straight-chained saturated alkylene radical having 2 to 4 carbon atoms. For example, $R^1$ may be —$CH_2$—$CH_2$— (succinic anhydride is the saturated cyclic acid anhydride) or —$CH_2$—$CH_2$—$CH_2$— (glutaric anhydride is the saturated cyclic acid anhydride). $R^1$ may also be a substituted saturated alkylene radical having 2 to 4 carbon atoms in the alkylene portion and including at least one alkyl, alkenyl, aryl or alkylaryl substituent bonded to at least one of the carbon atoms of the alkylene portion. For example, the saturated cyclic acid anhydride may be an alkyl, alkenyl, aryl or alkylaryl succinic anhydride or an alkyl, alkenyl, aryl or alkylaryl glutaric anhydride wherein the alkyl, alkenyl, aryl or alkylaryl groups preferably have 1 to 18, more preferably 8 to 12, carbon atoms. For example, if dodecenylsuccinic anhydride (available for example from Dixie Chemical Company) is employed, $R^1$ will have the structure

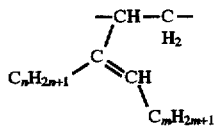

wherein n+m=10. $R^1$ also may be a divalent unsubstituted or substituted arylene wherein the divalent bond sites are located on the aromatic ring. Alkyl, halo, alkoxy and alkenyl groups are among the possible substituent groups on the aromatic ring. For example, the saturated cyclic acid anhydride may be phthalic anhydride and thus $R^1$ will have the structure

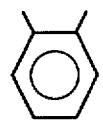

$R^1$ may also be a saturated heterocyclic radical having at least 2 carbon atoms. For example, the saturated cyclic acid anhydride may be diglycolic anhydride and thus $R^1$ will have the structure

—$CH_2$—O—$CH_2$—

$R^2$ is derived, along with the carboxy ester radical linking $R^1$ and $R^2$, from the reaction of a terminal carboxyl group of the carboxylic acid-terminated polyalkadiene intermediate product and an epoxy group of an olefinic monoepoxide compound, preferably a compound that contains both an epoxide and a vinylidene group. $R^4$ may be a divalent alkylene, divalent alkylene ester, divalent arylene or divalent alkylene ether. $R^4$ preferably is an alkylene ester, particularly —$CH_2$—O—C(O)—.

The vinylidene or olefinic terminal group of polymer B is derived from the vinylidene or olefinic group of the olefinic monoepoxide. Consequently, $R^3$ depends upon the structure of the group attached to the β-carbon of the vinylidene or olefinic group of the olefinic monoepoxide. $R^3$ preferably is hydrogen or an alkyl such as methyl.

$R^7$ is derived from the capping of the hydroxyl group of $R^2$ with a monoisocyanate compound. $R^6$ preferably is phenyl or a phenylalkyl such as m-isopropenyl-α,α-dimethyl benzyl.

Polymer A and Polymer B can have a number average molecular weight of about 1,500 to 10,000, preferably about 1,500 to 6,000.

Polymers A and B can be prepared according to following synthesis scheme:

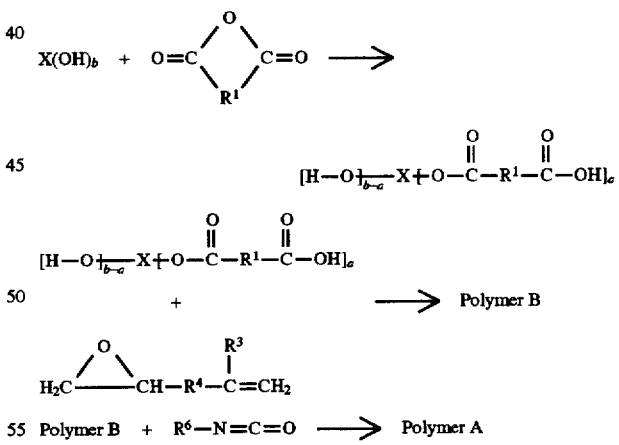

The polyalkadiene that is employed as the polymer backbone precursor in this scheme includes on average at least 1.2, preferably at least 2, hydroxyl terminal or pendant groups per polymer molecule and preferably has the structure $X(OH)_b$ wherein b is at least 1.2, and preferably is 1.2 to 3, more preferably 1.6 to 2.4 per polymer molecule. A particularly preferred precursor is hydroxyl-terminated polybutadiene. As used herein, "hydroxyl-terminated" means that there is at least one hydroxyl group occupying the terminal position of the polymer chain or the terminal position of a pendant group. Such hydroxyl-terminated polyalkadienes are well-known and hydroxyl-terminated polybutadiene is commercially available, for example, from Elf-Atochem under the tradenames "R45HT" and "R20LM". The number average molecular weight of the hydroxyl-terminated polyalkadiene can range from 1,000 to 9,500, preferably from 1,000 to 5,500.

The hydroxyl-terminated polyalkadiene is converted into a carboxylic acid-terminated polyalkadiene via a ring-opening reaction with the saturated cyclic acid anhydride. As used herein, "carboxylic acid-terminated" means that there is at least one carboxylic acid group occupying the terminal posiiton of the polymer chain or the terminal position of a pendant group. Although not necessarily required, a catalyst may be used to promote this reaction. The catalyst chosen for the anhydride ring-opening reaction is preferred to be simultaneously a catalyst for the subsequent reactions as well. Tertiary amine catalysts are particularly advantageous and include materials such as triethylene diamine, benzyl dimethyl amine, 4-dimethylamino pyridine, and triethyl amine. Other organic bases like alkylated amidines and guanidines are also particularly advantageous. The preferred catalyst is 1,8-diazabicyclo[5.4.0]undec-7-ene. Lewis acids are also effective as catalysts.

It is not necessary to convert all the hydroxyl groups to carboxyl groups in the first step. Conversions of 50 to 100%, preferably 65 to 99% will result in sufficient formation of intermediate that is useful to synthesize polymer B and polymer A. It is preferred that the conversion of hydroxyl groups to carboxyl groups be limited so that the average acid functionality per polymer chain of the carboxylic acid-terminated intermediate is not greater than 2. In general, between 0.5 and 1 mole of saturated cyclic acid anhydride is reacted per mole of hydroxyl-terminated polyalkadiene. Consequently, the reaction product of the hydroxy-terminated polyalkadiene and the saturated cyclic acid anhydride can result in a mixture that includes polymer chains that have a distribution of terminal or pendant carboxyl groups, polymer chains that predominantly have two terminal carboxyl groups and/or polymer chains that have one terminal carboxyl group as well as unreacted hydroxyl-terminated polyalkadiene. Typically, there is no need to separate any of the components of this reaction product mixture in order to perform the subsequent reaction steps.

As described above, the saturated cyclic acid anhydride can be any acid anhydride that does not include any non-aromatic unsaturation in the ring structure that includes the acid anhydride functionality. Examples of such saturated cyclic acid anhydrides include succinic, glutaric, methylsuccinic, 2,2-dimethylsuccinic, cyclohexanedicarboxylic, cis-1,2,3,6-tetrahydrophthalic, cis-5-norbornene-endo-2,3-dicarboxylic, methyl-5-norbornene-2,3-dicarboxylic, exo-3,6-epoxy-1,2,3,6-tetrahydrophthalic diglycolic and the like; aromatic anhydrides such as phthalic, tetrabromophthalic, 3,6-dichlorophthalic, 1,8-naphthalic, diphenic, 4-bromo-1,8-naphthalic, and the like; and alkenyl succinic anhydrides such as butenyl succinic, octenyl succinic, dodecenyl succinic, octadecenyl succinic, and the like.

The carboxylic acid-terminated polyalkadiene is reacted with an olefinic monoepoxide, preferably a compound that includes a terminal epoxy group and a vinylidene group. The molar ratio of olefinic monoepoxide to carboxylic acid functionality of the carboxylic acid-functional intermediate can be 80 to 140%, more preferably 95 to 135%. It should be recognized that this olefinic monoepoxide is distinguishable from an epoxy resin because it includes a terminal olefinic or vinylidene group and usually has a molecular weight that is lower than that of an epoxy resin. Olefinic monoepoxide compounds useful in this invention can include 2-methyl-2-vinyl oxirane, 4-vinylphenyl oxirane, 3-vinylphenyl oxirane, 2-vinylphenyl oxirane, vinyl glycidic ester, glycidyl acrylate, glycidyl methacrylate, and the like. Most preferred are glycidyl acrylate and glycidyl methacrylate. The catalyst preferably is a tertiary amine such as is previously described for the anhydride ring-opening reaction.

The secondary nascent hydroxyl groups remaining after the second reaction, as well as any hydroxyls remaining from the original hydroxyl-terminated polyalkadiene, are capped by contacting polymer B with one or more monoisocyanate compounds, with aromatic monoisocyanates being especially preferred. The molar ratio of monoisocyanate compound to polymer B can be 80 to 98%, preferably 90 to 95%, based on the total hydroxyl functionality of polymer B. Representative monoisocyanate compounds include isocyanatoethyl acrylate, isocyanatomethyl methacrylate, isocyanatoethyl methacrylate, phenyl isocyanate, napthyl isocyanate, octadecyl isocyanate and [benzene, 1-(1-isocyanato-1-methylethyl)-4-(1-methyl ethenyl)], with phenyl isocyanate being preferred.

An advantage of the above described reactive scheme is that the indicated reaction steps can be performed sequentially in situ. In other words, the hydroxyl-terminated polyalkadiene, the saturated cyclic acid anhydride, the olefinic monoepoxide and the monoisocyanate can be introduced sequentially into a single reaction vessel. All the reaction steps may be effected at temperatures of 50° to 120° C., with 75° to 95° C. being preferred for the first reaction step, 100° to 120° C. for the second reaction step, and 50°–65° C. for the third reaction step. Similarly, the reaction steps can be carried out at atmospheric pressure, but a slightly greater than atmospheric pressure such as up to 50 psi could possibly be advantageous.

Preferably, the reaction is carried out under anaerobic conditions using an inert gas atmosphere and in the presence of inhibitors due to the reactivity of the allylic hydrogens to autooxidation. Any known inhibitor may be used such as, but not limited to, benzoquinone, 2,5-dichlorobenzoquinone, di-t-butyl-p-cresol, pyrogallol, nitrobenzene, methylbenzoquinone, 4-methoxyphenol, phenothiazine, and similar materials.

Another advantage of the present invention is that although a diluent such as methacrylate may be used, it is not necessary during the reactive process because all of the reactants and products, including polymer A and polymer B, have sufficiently low viscosities to alleviate the need for a diluent. If polymer A is intended to be used in an adhesive composition the reaction product produced by the third reaction step that includes polymer A may be diluted with a reactive monomer.

EXAMPLE 1

In an inert atmosphere 631 g of a polybutadiene (available from Elf-Atochem under the tradename "R45HT"), having 2.4–2.6 terminal OH groups per molecule (0.54 eq of hydroxyl) and a number average molecular weight of 2800, and 59.9 g (0.40 moles) of phthalic anhydride are reacted in the presence of 0.6 g (0.004 moles) of 1,8-diazabicyclo [5.4.0]undec-7-ene at 85° C. until the acid number drops to 0.58 meq/g. To this mixture is added 76.6 g (0.54 moles) of glycidyl methacrylate, 0.41 g of 4-methoxyphenol, and 0.83 g of methyl-p-benzoquinone. The mixture is reacted at 113° C. until the acid functionality is determined to be less than 0.04 meq/g. The product is designated RM-1 and includes a polymer having a structure as shown above for polymer B. As an option, the product mixture can be diluted to 90% total solids content by adding 77 g of tetrahydrofurfuryl methacrylate to improve storage and ease of transfer and handling.

EXAMPLE 2

To 686 g of RM-1 is added 61 g (0.51 moles) of phenyl isocyanate. The mixture is reacted at 65° C. for 8–10 hours until the residual isocyanate content is measured at less than 0.05%. To this reaction product mixture is added 83 g of tetrahydrofurfuryl methacrylate. The resulting mixture is designated RM-2 and includes a polymer having a structure as shown above for polymer A.

EXAMPLE 3

In an inert atmosphere blanket 631 g of a polybutadiene (Elf-Atochem "R45HT"), having 2.4–2.6 terminal OH groups per molecule and an number average molecular weight of 2800, and 90.1 g (0.27 moles) of alkenyl succinic anhydride are reacted in the presence of 0.6 g of 1,8-diazabicyclo[5.4.0]undec-7-ene at 85° C. until the acid number drops to 0.37 meq/g. To this mixture is added 38.4 g of glycidyl methacrylate, 0.4 g of 4-methoxyphenol, and 0.8 g of 4-methyl-p-benzoquinone. The mixture is reacted at 113° C. until the acid functionality was determined to be less than 0.04 meq/g. As an option, the reaction product mixture can be diluted to 90% total solids content by adding 85 g of tetrahydrofurfuryl methacrylate. The reaction product mixture includes a polymer having a structure as shown above for polymer B.

EXAMPLE 4

In an inert atmosphere blanket 747.4 g (0.42 moles) of a poly (ethylene/butylene) polymer (a partially-hydrogenated polybutadiene available from Shell Chemical under the tradename "KRATON HPVM-2203") having 1.9 terminal hydroxyl groups per molecule and a hydroxyl equivalent weight of 1800 and 46.1 g (0.31 moles) of phthalic anhydride are reacted in the presence of 0.5 g of 1,8-diazabicyclo[5.4.0]undec-7-ene at 85° C. until the acid number drops to 0.39 meq/g. To this mixture is added 59.0 g (0.42 moles) of glycidyl methacrylate, 0.42 g of 4-methoxyphenol and 0.85 g of 4-methyl-p-benzoquinone. The resulting mixture is reacted at 113° C. until the acid functionality is determined to be less than 0.02 meq/g to produce a polymer having a structure as shown above for polymer B. As an option, the resulting product mixture can be diluted to 90% total solids content by adding 85 g of tetrahydrofurfuryl methacrylate.

What is claimed is:

1. A polymer having a representative structure comprising

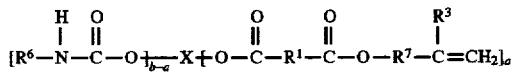

wherein

X is a polyalkadiene residue, a averages from 1.2 to 2.6 per polymer molecule, provided a is ≦ b, b is at least 1.2 per polymer molecule, $R^1$ is a divalent radical that includes at least two carbon atoms and is selected from the group consisting of saturated alkylene, substituted saturated alkylene, arylene, and saturated heterocyclic, $R^6$ is phenyl, napthyl, an alkyl group having from 1 to 24 carbon atoms, substituted phenyl, substituted napthyl, phenylalkyl or napthylalkyl, $R^7$ has the structure

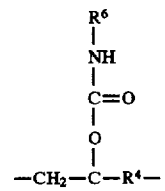

wherein $R^4$ is a divalent radical selected from the group consisting of alkylene, alkylene ester, arylene and alkylene ether, and $R^3$ is hydrogen, an alkyl group of 1 to 4 carbon atoms, $-CH=CH_2$, or $-R^5-CH=CH_2$ wherein $R^5$ is an alkylene radical having 1 to 4 carbon atoms.

2. A polymer according to claim 1 wherein X comprises a polyalkadiene residue that is derived from at least one of polybutadiene, poly(butadiene-acrylonitrile), poly(butadiene-methacrylonitrile-acrylic acid), partially-hydrogenated polybutadiene or fully-hydrogenated polybutadiene.

3. A polymer according to claim 1 wherein X includes at least a 1,4-polybutadiene repeating unit.

4. A polymer according to claim 1 wherein $R^1$ is a divalent saturated alkylene having 2 to 4 carbon atoms.

5. A polymer according to claim 1 wherein $R^1$ is a divalent substituted saturated alkylene having 2 to 4 carbon atoms in the alkylene portion and including at least one alkyl, alkenyl, aryl or alkylaryl substituent bonded to at least one of the carbon atoms of the alkylene portion.

6. A polymer according to claim 1 wherein $R^1$ is a divalent unsubstituted or substituted arylene wherein the divalent bond sites are located on the aromatic ring.

7. A polymer according to claim 1 herein $R^4$ is $-CH_2-O-C(O)-$.

8. A polymer according to claim 1 wherein $R^3$ is an alkyl group having 1 to 4 carbon atoms.

9. A polymer according to claim 1 wherein $R^6$ is phenyl or phenylalkyl.

10. A polymer according to claim 1 wherein $R^6$ is phenyl or substituted phenyl, $R^3$ is an alkyl group having 1 to 4 carbon atoms, $R^1$ is selected from the group consisting of a divalent saturated alkylene having 2 to 4 carbon atoms, a divalent substituted saturated alkylene having 2 to 4 carbon atoms in the alkylene portion and including at least one alkyl, alkenyl, aryl or alkylaryl substituent bonded to at least one of the carbon atoms of the alkylene portion, and a divalent unsubstituted or substituted arylene wherein the divalent bond sites are located on the aromatic ring, and X comprises a polyalkadiene residue that is derived from at least one of polybutadiene, poly(butadiene-acrylonitrile), or poly(butadiene-methacrylonitrile-acrylic acid).

11. A polymer according to claim 1 wherein the polymer is a liquid.

* * * * *